C. VON GIZINSKY.
SIGNAL DEVICE.
APPLICATION FILED FEB. 10, 1915.

1,233,002.

Patented July 10, 1917.
2 SHEETS—SHEET 1.

Witnesses
G. F. Rudolph
William R. Smith

Inventor
C. Von Gizinsky,
By Victor J. Evans
Attorney

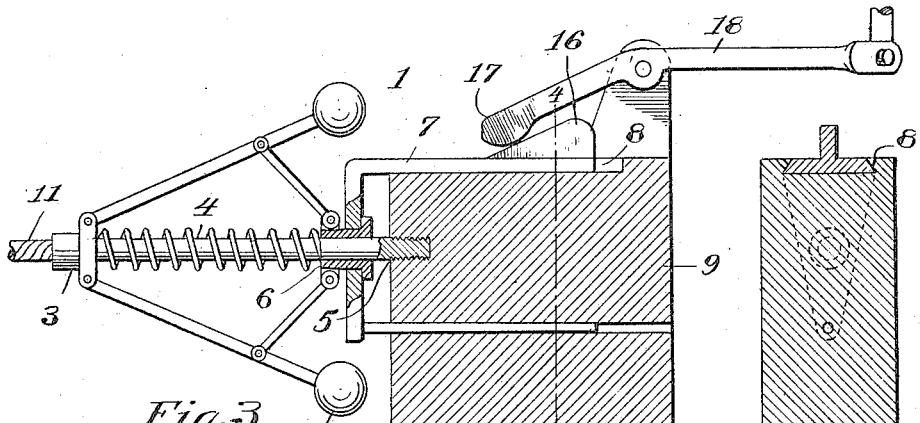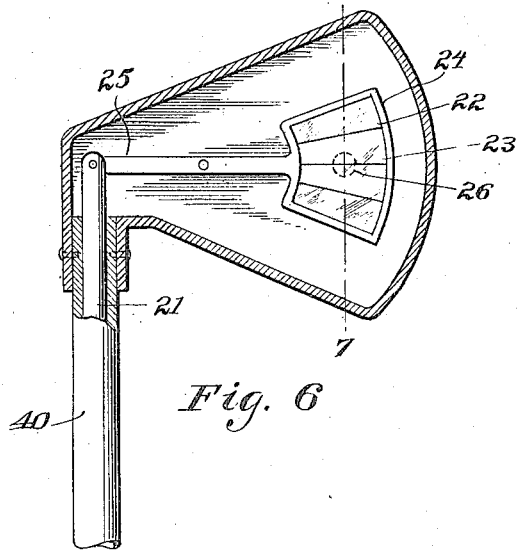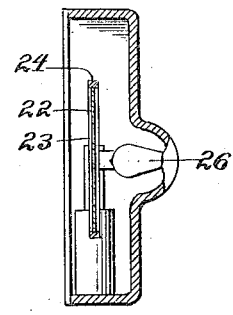

ately simple, practical,

UNITED STATES PATENT OFFICE.

CASIMIR VON GIZINSKY, OF SCHENECTADY, NEW YORK, ASSIGNOR OF FORTY-FIVE ONE-HUNDREDTHS TO CHRISTOPHER C. KEHOE, OF SCHENECTADY, NEW YORK.

SIGNAL DEVICE.

1,233,002.

Specification of Letters Patent.  Patented July 10, 1917.

Application filed February 10, 1915. Serial No. 7,411.

*To all whom it may concern:*

Be it known that I, CASIMIR VON GIZINSKY, a citizen of the United States, residing at Schenectady, in the county of Schenectady and State of New York, have invented new and useful Improvements in Signal Devices, of which the following is a specification.

This invention relates to signaling devices and has to do more particularly with a signal for indicating the speed of a vehicle.

The invention has for one of its objects to provide an extremely simple, practical, and effective device of novel construction which will take up comparatively little space on the rear of a vehicle and can be readily attached and detached at will.

Another object of the invention is the provision of a signaling device wherein the high speed is indicated by red, the low speed by white, and the intermediate speed by green, the different colors being produced by transparent lenses placed in front of an illuminating device.

A still further object of the invention is the provision of a signaling device wherein the operating mechanism is under the body of the vehicle while the signaling device is above the platform.

Still another object of the invention is to provide a novel connection between the speed controlled mechanism and the signal device, such connection comprising a substantially U-shaped slide mounted for movement in a suitable guide and being centrally connected to the speed controlling mechanism, by means of which it is caused to reciprocate within the guide, the said slide having one of its arms provided with a cam for engagement with the free end of the pivoted lever for operating the signaling device.

With these and other objects in view as will appear as the nature of the invention is more fully understood, the invention comprises the various novel features of construction and arrangement of parts which will be more fully described hereinafter and set forth with particularity in the appended claims.

In the accompanying drawing which illustrates one embodiment of the invention,

Fig. 3 is an enlarged sectional view through a portion of the mechanism.

Fig. 4 is a section on line 4—4 of Fig. 3.

Fig. 5 is a horizontal sectional view of the signaling apparatus.

Fig. 6 is a vertical section.

Fig. 7 is a section on line 7—7 of Fig. 6.

Corresponding and like parts are referred to in the following description, and indicated in all the views of the drawings by the same reference characters.

Figure 1:
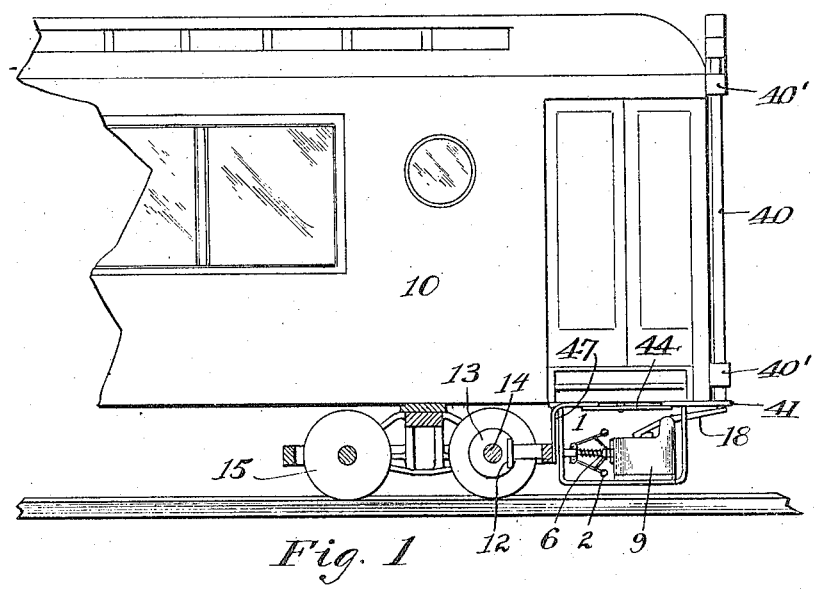
Figure 1 is a side elevation of a vehicle showing my invention applied thereto.

Referring to the drawings, 1 designates the operating mechanism of my device which is positioned below the platform of the vehicle 10 in a position adjacent the rear truck. This mechanism comprises an ordinary ball governor 2 that has one extremity 3 mounted on the rod 4 that is formed integral with or secured to a bracket 9 as shown at 5, the other extremity 6 of the governor being slidably mounted on the rod so as to give movements to a slide 7 to which it is connected, the remaining end of the said governor being slidably mounted on the shaft 4 and rigidly secured to a sleeve 6 carried by a slide 7. The slide 7 has a dove-tail connection 8 with the block 9 carried by the body of the vehicle 10. The shaft passes centrally through the slide 7 and has a flexible connection 11 with a disk 12, said disk having its peripheral face in frictional contact with a disk 13 rigidly mounted on the axle 14 of the vehicle truck 15.

Upstanding from the slide is a lug 16 provided with an inclined surface adapted to contact with the enlarged portion 17 of a link 18, the remaining end of the link being connected to a vertical rod 21.

Pivoted to the upper end of the vertical rod is a signal blade 22 comprising a series of transparent plates 23 supported in position by a frame 24 carried by one end of the lever 25, said lever being pivoted intermediate of its ends so as to allow the transparent plates to move in an arc of a circle in a direction opposite from that in which the vertical rod is traveling, thereby successively bringing the plates opposite the signaling lamp 26.

When in use the operating mechanism will be positioned beneath the body of the vehicle adjacent the truck so as to bring the disk 12 in contact with the disk on the axle. The signal blade is mounted on the rear platform so as to be visible by a following vehicle, the signal blade being connected to the operating mechanism through the link mechanism as heretofore described. As the governor is accelerated by the speed of the vehicle the balls fly outward by centrifugal force and thus bring the loosely mounted end toward the rigidly mounted end with the result that the slide is moved along the bracket. This movement of the slide causes the signal blade, through the link mechanism to move in the arc of a circle, thereby bringing the green or red plates, according to the speed of the vehicle, into registration with the beam of light emerging from the lamp 26.

Figure 2:
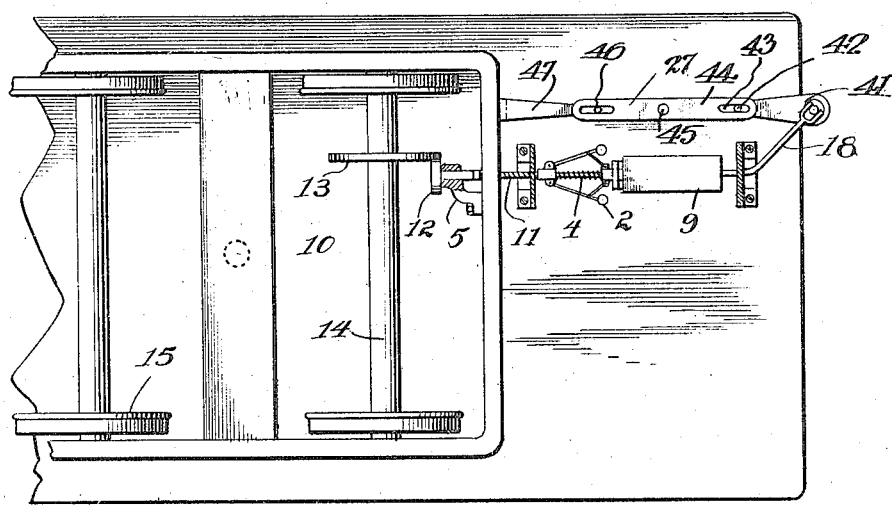
Fig. 2 is a bottom plan view thereof.

If desired, suitable means may be provided for turning the signal so as to project the rays of light parallel with the track at all times. This means includes the casing 40 in which the vertical rod 21 operates, this casing being mounted in bearings 40' upon the front end of the vehicle in a manner to permit it to revolve therein. The lower end of the casing 42 has connected thereto a lever 41, which lever carries at its opposite end a pin 42 which is engaged and movable in a slot 43, provided in one end of a pivoted lever 44, the pivot of which is indicated at 45. The opposite end of this lever is provided with a slot similar to the slot 43, within which operates a pin 46, which is carried at one end of the bar or rod 47 secured to the frame of the truck. By reference to Fig. 2 it will be apparent that when the truck is turned upon its pivot the lever 44 will be rocked to rotate the sleeve 40 in bearings 41 and cause the signal to face in the direction of the turning of the truck.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed is:

1. A speed controlled signaling device, comprising in combination, a driven shaft, a governor operated thereby, a horizontally movable slide, a guiding member for said slide, said slide comprising a substantially U-shaped member having its central portion connected to said governor and its arms movable in said guide, a cam carried by one of said arms, a pivoted lever having its free end located in the path of said cam and a signal device operated by said lever.

2. A speed controlled signaling device, comprising in combination a driven shaft, a governor operated thereby, a horizontally movable slide, a guide member for said slide, said slide comprising a substantially U-shaped member having its central portion connected to said governor and its arms movable in said guide, a cam provided upon one of said arms, a pivoted lever having its free end located in the path of said cam, a rod pivoted to the opposite end of said lever, a second pivoted lever pivoted to the opposite end of said rod, a casing surrounding the last mentioned pivoted lever and the upper end of the rod, segmental plates carried by the last mentioned lever and a lamp located within the casing in the path of movement of said plates.

In testimony whereof I affix my signature in presence of two witnesses.

CASIMIR VON GIZINSKY.

Witnesses:
JOHN J. McMULLEN,
CLIFFORD E. CADY.

Copies of this patent may be obtained for five cents each, by addressing the "Commissioner of Patents, Washington, D. C."